(12) United States Patent
Barnetche et al.

(10) Patent No.: US 8,467,966 B2
(45) Date of Patent: Jun. 18, 2013

(54) DEVICE FOR AIDING THE FLIGHT MANAGEMENT OF AN AIRCRAFT

(75) Inventors: Bertrand Barnetche, Toulouse (FR); François Coulmeau, Seilh (FR); Julien Klotz, Toulouse (FR); Jérôme Sacle, Toulouse (FR)

(73) Assignee: Thales, Neuilly-sur-Seine (FR)

( * ) Notice: Subject to any disclaimer, the term of this patent is extended or adjusted under 35 U.S.C. 154(b) by 361 days.

(21) Appl. No.: 12/900,783

(22) Filed: Oct. 8, 2010

(65) Prior Publication Data
US 2011/0087428 A1    Apr. 14, 2011

(30) Foreign Application Priority Data
Oct. 9, 2009    (FR) ...................................... 09 04850

(51) Int. Cl.
*G08G 1/123*    (2006.01)
(52) U.S. Cl.
USPC .......................................................... 701/532
(58) Field of Classification Search
None
See application file for complete search history.

(56) References Cited

U.S. PATENT DOCUMENTS

| | | | |
|---|---|---|---|
| 6,842,122 B1 | 1/2005 | Langner et al. | |
| 8,087,616 B2 * | 1/2012 | Shuster | 244/175 |
| 8,292,234 B2 * | 10/2012 | Shuster | 244/175 |
| 2007/0053513 A1 * | 3/2007 | Hoffberg | 380/201 |
| 2008/0120129 A1 * | 5/2008 | Seubert et al. | 705/1 |
| 2008/0155007 A1 | 6/2008 | Launer et al. | |
| 2010/0106346 A1 * | 4/2010 | Badli et al. | 701/3 |

FOREIGN PATENT DOCUMENTS

WO    2009037248    3/2009

* cited by examiner

*Primary Examiner* — Thomas Tarcza
*Assistant Examiner* — Adam Alharbi
(74) *Attorney, Agent, or Firm* — Baker & Hostetler, LLP

(57) ABSTRACT

A device for aiding the flight management of an aircraft includes a navigation display, a personalized database capable of storing navigation-aid data, each datum comprising a classification type representative of a family or of one or more categories of navigation-aid data, one or more periods of validity of the said datum, information relating to at least one geographic zone of the said datum, one graphic and/or textual representation of the said datum, selection means allowing an operator to choose one (or more) type(s) of classification, called selected type(s), extraction means capable of extracting from the personalized database the navigation-aid datum or data called extracted data of which the type is equal to at least one selected type, of which at least one geographic zone is situated at a distance, from the flight plan or from the aircraft, that is less than a predetermined maximum distance and of which at least one period of validity verifies a predefined display time criterion, the said extraction means transmitting the said extracted datum or data to the said navigation display capable of displaying the representations of the said extracted data.

20 Claims, 5 Drawing Sheets

DEVICE FOR AIDING THE FLIGHT MANAGEMENT OF AN AIRCRAFT

CROSS-REFERENCE TO RELATED APPLICATION

This application claims priority to foreign French patent application No. FR 09 04850, filed on Oct. 9, 2009, the disclosure of which is incorporated by reference in its entirety.

FIELD OF THE INVENTION

The invention relates to a device for aiding flight management. A device for aiding flight management conventionally includes a flight management system FMS and a man-machine interface comprising a navigation display.

BACKGROUND OF THE INVENTION

FIG. 1 shows a known device 100 for aiding flight management installed on board an aircraft. This device conventionally comprises a flight management system FMS 2 capable of constructing a flight plan. Conventionally, a flight plan defines the route that the crew of an aircraft plans to follow in order to go from a starting position to a destination point of its mission and the conditions for travelling this route. The flight plan is defined by geographic elements of the flight plan, namely a succession of waypoints WP connected by straight or curved segments called "legs" and elements associated with various flight requirements of heading, of altitude, of speed, of passage time, etc. that must be adhered to by the aircraft when it passes over or in their vicinity. The flight plan also comprises a lateral trajectory and a vertical trajectory in the horizontal plane and respectively in the vertical plane. In the rest of the text, elements of the flight plan will refer to the geographic elements of the flight plan, the elements associated with flight requirements and the lateral trajectory and the vertical trajectory of the flight plan.

The flight management system FMS, 2, conventionally comprises:
  location means LOCNAV, 170, for locating the aircraft based on information transmitted by geolocation means GEO, 220, of the aircraft which comprise for example satellite positioning receivers, radiofrequency beacons, inertial navigation units;
  means 110, 130, 150 for storing flight parameters comprising:
    means FPLN, 110, for storing the geographic elements of the flight plan, constituting the skeleton of the route to be followed, input by the crew by means of the on-board console MCDU, 3, which will be described hereinafter,
    a navigation database NavDB, 130, updated every 28 days, capable of storing standard data essential to the construction of the flight plan, based on standard data supplied by the aviation authorities (the method for feeding the base is as follows: supply of the aviation data by the States or delegated bodies, conversion to the A424 format for the suppliers of data of the EAG, Jeppesen or LSY type, then conversion to a binary format that is optimized and the property of each FMS manufacturer),
    a performance database, PerfDB 150, containing the aerodynamic and engine parameters of the aircraft,
  computing means 120, 140 for constructing the flight plan based on the data stored in the storage means 110, 130, 150, the said computing means 120, 140 comprising:
    a module for constructing a lateral trajectory TRAJ, 120, for constructing a continuous lateral trajectory based on the geographic elements of the flight plan, complying with the aeroplane performance and the requirements stored in the navigation database NavDB 130,
    a module for constructing a vertical trajectory PRED, 140, for constructing a vertical profile optimized on the lateral trajectory complying with the performance of the aeroplane and the requirements stored in the navigation database NavDB, 130,
  a guidance module GUID 200, for generating guidance commands making it possible to guide the aircraft in the lateral and vertical planes along the flight plan, while optimizing its speed, the guidance commands then being transmitted to the pilot or to an automatic pilot not shown,
  a ground/aircraft communication system called CMU (the acronym for "Communication Management Unit"), 180, allowing the flight management system to communicate with stations based on the ground, in particular air traffic control ATC stations, 370, or airlines or else to communicate with other aircraft.

The elements of the FMS are conventionally connected together but the links between these elements are not shown for greater clarity.

The standard data stored in the navigation database comprise published navigation procedures NavDB (for example, take-off or landing procedures, air routes) that the aircraft may be required to comply with in the space in which it operates. The standard data also include information concerning airports, runways and radionavigation beacons.

Conventionally, the aircraft is connected to a man-machine interface 3 called the MCDU ("Multipurpose Control Display Unit"), 3, which is a data input and display console comprising manual inputting means 4, comprising keys, allowing the crew to enter data into the said console, to select zones displayed on a display called the navigation display ND, 5, and to activate the selected zone in order to initiate operations that relate to what is displayed. The navigation display ND, 5, is capable of displaying a window (optionally occupying the whole display) dedicated to navigation, comprising (graphic and optionally textual) representations of elements of the flight plan in a geographic space called the display zone ZA such as, for example, the lateral trajectory and/or of the lateral trajectory and the various waypoints WP of the position of the aircraft. Representations (which may be graphic and optionally textual) of data stored in the navigation database may also be displayed. The window dedicated to navigation helps the crew to follow the flight plan. It is displayed automatically or on command of the crew using the manual inputting means.

Navigation-aid data that are distinct from the standard data of the navigation database NavDB are also useful to the pilot for completing his mission. They involve, for example, textual information relating to the route, to the airport of departure or arrival, air traffic management (ATM) data (sector limits, safety altitudes at given positions, airspace divisions), data relating to towns, rivers, forests, borders between countries, high-voltage lines, motorways.

The navigation-aid data are currently available in documents available in paper form on the flight deck or in an electronic flight bag (EFB), replacing the paper documentation and being disconnected from the flight management system FMS and from the flight console MCDU. However, consulting the aforementioned information in these media is time-consuming for the pilot. Moreover, it is difficult to find and take account of the information that is of use to the pilot during his mission. For example, it is necessary to carry out calculations, based on the current position of the aircraft and on information showing a border with a country over which flying is banned, in order to ensure that the aircraft does not penetrate the banned airspace. This calculation represents a risk factor because, on the one hand, it requires the attention of the crew and, on the other hand, it is approximate. Certain corporate aeroplanes superpose a map over their navigation display ND corresponding to a cartographic background representing the ground situated beneath the flight plan. However, this information is fixed; it is not necessarily useful to the crew. Moreover, it is difficult to create a background which on the one hand does not overload the navigation display and, on the other hand, presents all the information useful to the pilot during his mission.

SUMMARY OF THE INVENTION

The object of the present invention is to propose a navigation-aid device which makes it easier for the crew on board to access the navigation-aid data that are useful to it and to take account of these data, while minimizing the number of tasks that have to be performed by the crew.

Accordingly, the subject of the invention is a device for aiding the flight management of an aircraft comprising a navigation display, a flight management system comprising means for computing a flight plan that the aircraft is assumed to have to follow, the said device also comprising:

- a personalized database capable of storing navigation-aid data, each datum comprising a classification type representative of a family or of one or more categories of navigation-aid data, one or more periods of validity of the said datum, information relating to at least one geographic zone of the said datum, one graphic and/or textual representation of the said datum and a visibility slot,
- selection means allowing an operator to choose one (or more) type(s) of classification, called selected type(s),
- extraction means capable of extracting from the personalized database the navigation-aid datum or data called extracted data of which the type is equal to at least one selected type, of which at least one geographic zone is situated at a distance, from the flight plan or from the aircraft, that is less than a predetermined maximum distance, of which at least one period of validity verifies a predefined display time criterion, and of which at least one visibility slot comprises the external visibility, the said extraction means transmitting the said extracted datum or data to the said navigation display capable of displaying the representations of the said extracted data.

The device according to the invention optionally comprises the following features, taken alone or in combination:

- the family of a navigation-aid datum is either a family of textual data, or a family of geographic data taken from a family of air-traffic management data or a family of piloting-aid geographic data, the said families of navigation-aid data being optionally divided into categories,
- the navigation display is capable of displaying a window dedicated to the representations of the extracted data belonging to the family of textual data and/or a navigation-specific window dedicated to displaying representations of the elements of the flight plan and representations of the extracted data belonging to a family of geographic data,
- the extraction means are capable of extracting the navigation-aid datum or data, including the said geographic zone situated at a distance, from the flight plan or from the aircraft, that is less than the maximum distance and is also at least partly included in a predetermined geographic zone of display,
- a period of validity of a navigation-aid datum verifies the display time criterion when the intersection between the said period of validity of the said datum and a period of flight, during which the aircraft is assumed to have to follow the flight plan, is not zero,
- a period of validity of a navigation-aid datum verifies the display time criterion when at least one estimated time of passage at a point of intersection between at least one geographic zone of the said datum and the flight plan is included in at least one period of validity of the said datum,
- the extraction means are capable of extracting the navigation-aid datum or data in which also at least one period of validity includes the current time,
- a navigation-aid datum also comprises a range of display scales and the extraction means are capable of extracting the navigation-aid datum or data in which also the range of display scales comprises a display scale of the navigation window defined by the ratio between the size of the said display zone and the size of the navigation display,
- the personalized database comprises a homologated storage space and the extraction means are capable of extracting the navigation-aid datum or data also being stored in the homologated storage space,
- a navigation-aid datum also comprises a display context and the extraction means are capable of extracting the navigation-aid datum or data of which also the display context corresponds to the context of the aircraft.

The device according to the invention makes it possible to manage the updating and display of non-standard navigation-aid data. The storage of these data in a personalized database the updating cycle of which is flexible makes it possible to take account of the change in the data depending on the conditions of the mission and to present to the pilot information that is up to date. The centralized and automatic display of the data, depending on predetermined display criteria, makes it possible to reduce the load on the pilot. Moreover, the device ensures the usefulness and pertinence of the displayed information. The device prevents overloads of the navigation display. Displaying the geographic data in context makes it possible both to reduce the workload of the crew and to improve flight safety conditions. The piloting-aid geographic data serve as reference points to the crew in order to align the on-board systems for computing aeroplane position (i.e. ensure that they are operating correctly). They also serve as an aid during approach on sight or navigation routing procedures. Specifically the pilot relates, purely on viewing, the flight parameters and the flight management-aid data. This, for example, allows the pilot to avoid constant position calculations to verify that he is not entering banned airspace. More particularly, the display of the air traffic management ATM data in context on the navigation display makes it possible to improve communications between the crew and the air traffic control authorities. For example, a given frequency is associated with each sector, with each flight information region FIR and the crew must change frequency when it leaves one sector for another: displaying these sectors in context makes it possible to easily anticipate a change of frequency depending on the position of the aircraft and to check for the possibility of forgetting a change-of-frequency request on the part of air traffic control.

The device according to the invention provides the crew with an aide-memoire. Displaying the free text means that the pilot does not have to memorize the tasks he has to carry out.

The use of the navigation display ND makes it possible to avoid the installation of a new display in a cockpit that is already very congested. It saves power consumption, cost and room. The integration of the personalized database and of the extraction means, in the certified space of the flight management system FMS, makes it possible to prevent duplicating the bases and the computers within the aircraft and therefore prevents having to certify them and prevents additional power consumption. Moreover, the FMS is the preferred interface with the navigation display. It also makes it possible to ensure, from a display point of view, consistency between the elements of the flight plan and the navigation-aid data that are displayed. The navigation aids displayed form part of additional information to be brought to the flight plan. Finally, for the contextual display, it is worthwhile to use the FMS for this purpose, since the elements of the flight plan are data computed and stored in the FMS (route, altitude, position or data that are in the navigation database of the FMS, etc). It is therefore possible to associate a point or airport on the route with an item of contextual information to be displayed.

BRIEF DESCRIPTION OF THE DRAWINGS

Other features and advantages of the invention will appear on reading the following detailed description, made as a non-limiting example and with reference to the appended drawings in which.

From one figure to the next, the same elements are indicated by the same references.

DETAILED DESCRIPTION

Figure 1:
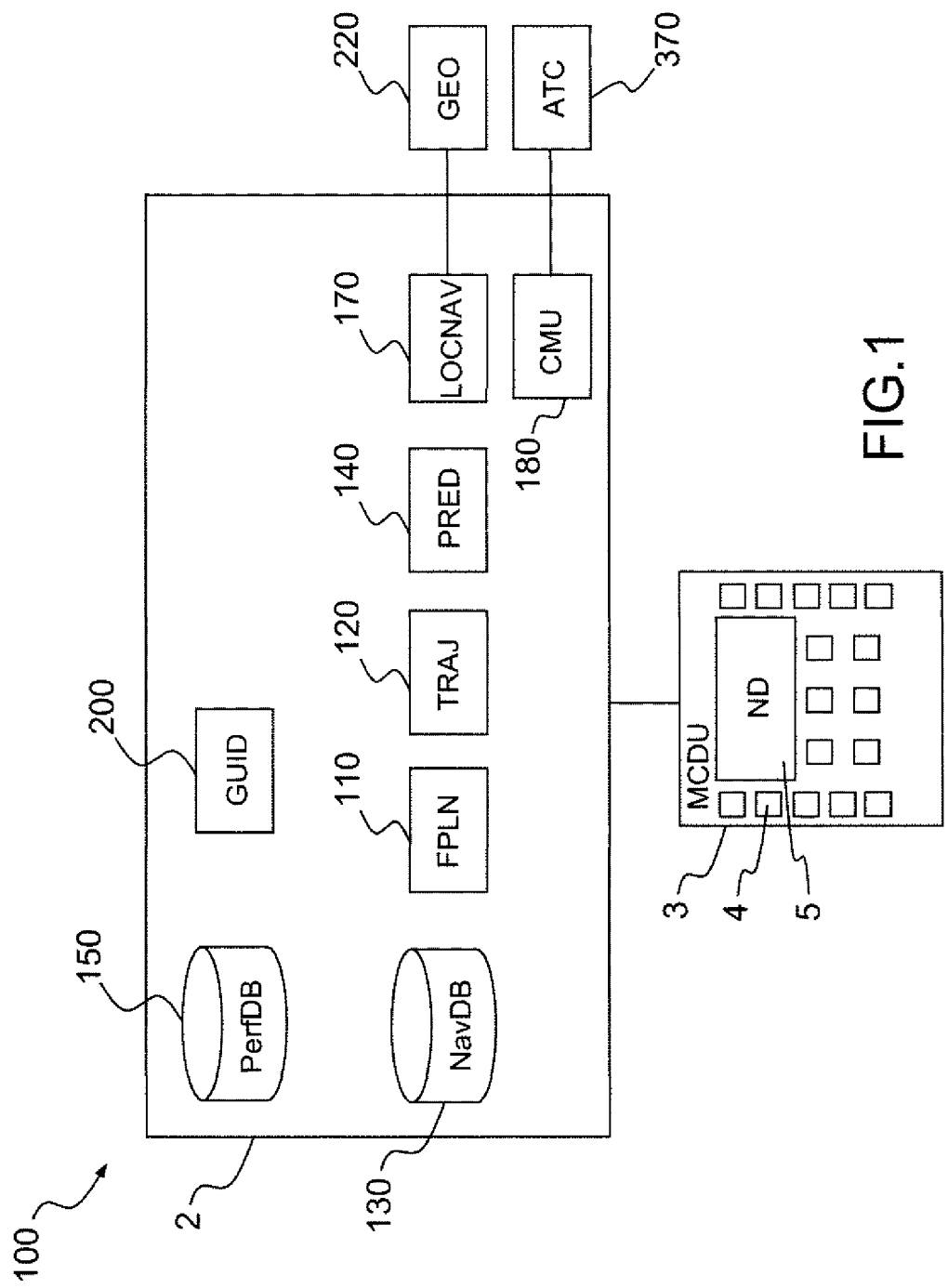
FIG. 1 represents schematically a known navigation-aid device.
Figure 2:
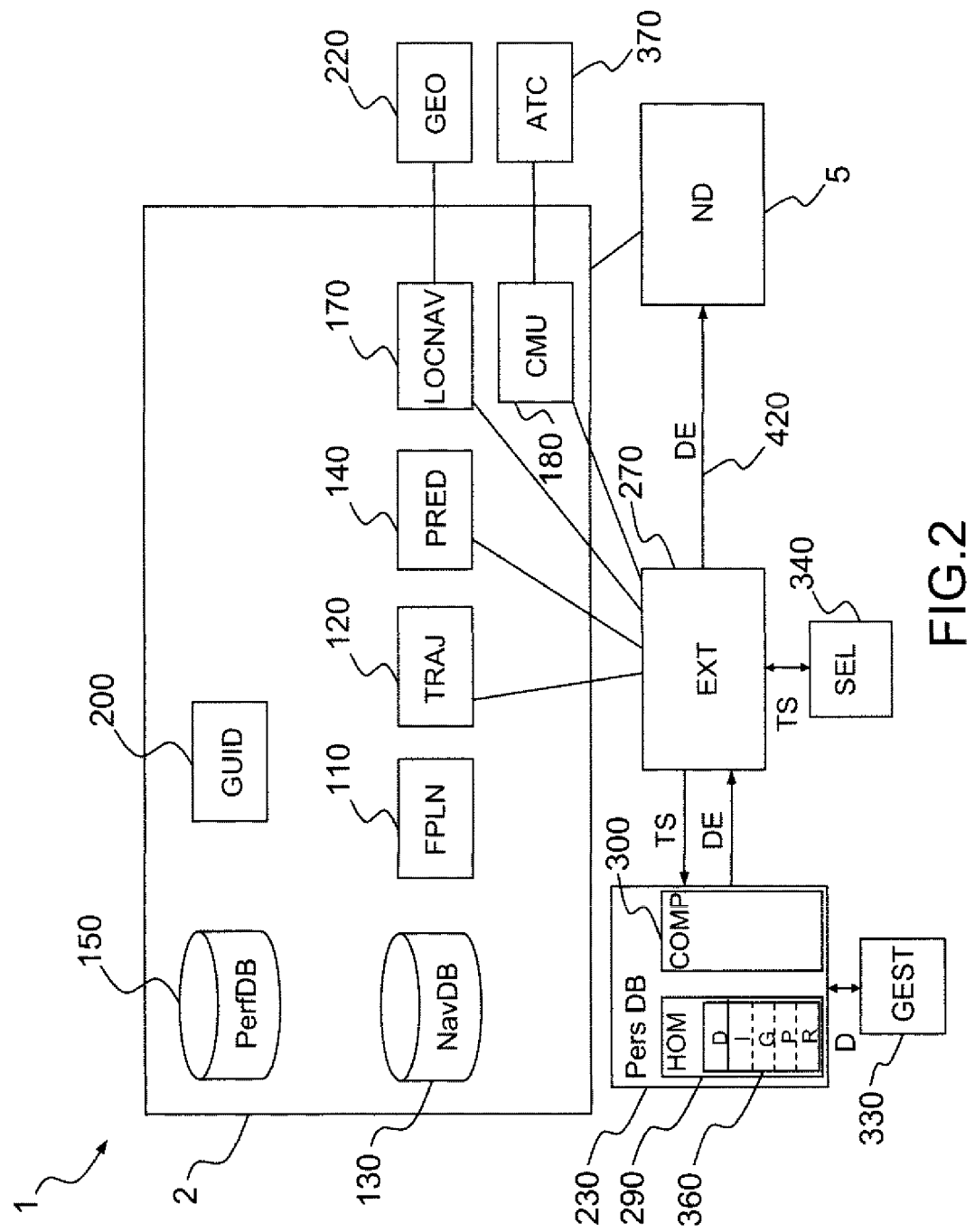
FIG. 2 represents schematically a first embodiment of a flight management aid device according to the invention.

FIG. 2 shows a flight management aid device 1 installed on board an aircraft according to a first embodiment of the invention. It comprises a flight management system FMS 2 as described in FIG. 1 which will not be described again. The device 1 according to the invention also comprises a personalized database PersDB, 230, capable of storing navigation-aid data D, 360, which are distinct from the standard data of the navigation database NavDB, 130. A navigation-aid datum D, 360, is an individual file comprising a type T, one or more periods P of validity, an item of information of position relative to the geographic zone ZG, a representation R of the said datum. The navigation-aid datum comprises optional links with (standard) data of the navigation database, such as for example the name of the airport to which it is attached, or with non-standard data.

There now follows a list of the various sorts of navigation-aid data to which reference is made in the present patent application. The navigation-aid data D can belong to several families, namely the family of textual data or a family of geographic data taken from the family of air traffic management ATM data, the family of geographic data for aiding piloting in conditions of flying by sight or on instruments. Each of the families can have several categories. An item of textual information (or free text) can belong to several categories, namely information relating to the route, to the airport of departure or arrival or else to the passengers. The textual information is information which needs to be taken into account to run the flight in total security; it conventionally belongs to the airline or to the air traffic control authorities. It does not usually match the strict phraseology with which the digital instructions sent to the flight crew must comply, but it is desirable all the same to be able to take them into account in flight.

The air traffic management ATM data family comprises several categories, namely of the sector limits, of the safe altitudes at given positions, of the airspace divisions (Flight Information Regions (FIR), the terminal region TMA (for "Terminal Manoeuvring (or Management or Movement) Area"). A safe altitude is for example a minimum altitude IFR (for "Instrument Flight Rules") which may be a minimum altitude for clearing obstacles MOCA (for "Minimum Obstacle Clearance Altitude"), a minimum enroute altitude (MEA), a minimum safe altitude (MSA), a minimum vectoring altitude (MVA) or an area minimum altitude (AMA).

The family of geographic data for aiding piloting in meteorological conditions of flying by sight (VMC for "Visual Meteorological Conditions") or for flying on instruments ("Instrumental Meteorological Conditions" (IMC)) comprises several categories, namely of towns, rivers, seas and oceans, obstacles, forests, borders between countries, high-voltage lines, motorways, trunk roads, railways.

The type T of classification of a navigation-aid datum D is representative of a family or else of one category (or a group of categories) of one or more families of navigation-aid data.

The periods of validity P of a datum D are periods during which a personalized datum is valid. A datum is valid when it exists (for example a town) or when it is likely to generate a requirement that the aircraft will have to comply with (for example military sectors are zones reserved for military tests that civil aircraft are not allowed to access at certain times.)

A geographic zone ZG associated with a datum D is a zone related to the datum. For example, the sector limits, the rivers, the motorways, are zones that have the shape of (or are delimited by) open or closed curves (for example polygons). A datum D also comprises information relating to one or more geographic zones ZG. More precisely, the information relating to a geographic position is relative to the position and the extent of the latter. This involves, for example, a name representative of the geographic zone (for example an airport or a waypoint) or a set of coordinates defining the geographic zone ZG in the horizontal plane and optionally in the vertical plane.

The information relating to the geographic zone ZG to which a textual datum relates is, for example, one or more identifiers (names) representative of the geographic zone ZG (which is for example a position relating to a task to be performed or an item of ATC/airline information, an airport, an airline route). A pair of airport names defining a route are stored for example.

The zones to which the air traffic management ATM data or the flight management aid data relate, which have the shape or which are delimited by an open or closed curve (rivers, motorways, borders, zone limits, etc.) are defined in the form of a table representing the positions in the horizontal plane (latitude and longitude) and optionally in the vertical plane of a set of points defining the said curve. They can be defined by a name representing the position and the extent of the said zone. The zones can also be defined by a minimum altitude and a maximum altitude representing respectively the lowest altitude and the highest altitude between which the curve is situated. The geographic zone ZG of a safe altitude is defined by the value of the safe altitude and by the name of the zone associated with this altitude or else by its coordinates in the horizontal plane. The geographic zone relating to a town is, for example, characterized by the name of the town and by its coordinates in the horizontal plane.

The graphic and/or textual representation R of a datum is the information that it is desired to display on a navigation display ND, 5, in order to represent the datum. For an item of information of the textual type, this is text. For the geographical data, it is a display symbol, that is to say a graphic representation and optionally a text associated with this graphic representation. The representation is characterized by its position, its shape and optionally its colour.

The personalized database PersDB, 230, is fed and updated by an operator who may be a member of the crew or an operator on the ground. The input or deletion of a personalized datum is carried out using management means GEST, 330, connected to the database PersDB, 230. Advantageously it includes manual input means and a display screen placed on the ground and/or on board the aircraft. A screen allows the operator (on the ground or on board) to view the information that he enters into the base and the data that are stored therein. The table that characterizes a geographic zone in the form of (or delimited by) a curve is either constructed based on the input of the coordinates by an operator or originates from the tracing of a polygon or of a curve by means of a graphic interface (or software application) comprising input means and a display screen.

The personalized database PersDB, 230, preferably comprises, as shown in FIG. 1, a homologated storage space HOM, 290, which contains the personalized data D that have been validated by the operational support team of the air operator just as for the verification of a navigation database. The base PersDB, 230, also comprises an additional storage space COMP, 300, dedicated to the storage of the data input at the last minute, namely in flight or prior to the flight. During a mission, an operator cannot modify the homologated storage space HOM, 290, but he can add new personalized data to the complementary space COMP, 300. It is therefore possible to include last-minute elements without waiting for a formal authorization to include the information in this database. The management means allow the pilot to transmit the data added at the last minute to the ground, for validation, before incorporating them into the homologated space HOM, 290. This partition makes it possible to save time by taking account of the invalidated last-minute data. Moreover, the integrity of the conventional storage space 290 is maintained during the flight stages because it is not affected by the last-minute additions. Adding, into the homologated space HOM, 290, a datum called a replacement datum to cancel an original datum has the effect of replacing the original datum with the replacement datum. Advantageously, the data added at the last minute are automatically erased at the end of the flight. As a variant, they are verified in order to be subsequently incorporated into the homologated space, HOM, 290, on the action of an operator.

The homologated space HOM, 290, can be updated at any time on the action of an operator (on the ground). The personalized base is more flexible than the navigation base NavDB, 130. In summary, the homologated database is a database containing unmodifiable data that have been validated by an operator outside the crew (essentially airline) in order to ensure the integrity and the quality of the said data.

The device 1 for aiding flight management according to the invention also comprises a navigation display ND, 5, connected to the extraction means 270 by linking means 420. The navigation display is preferably included in an on-board console MCDU, 3, connected to the FMS by the transmission means 420.

Figure 3:
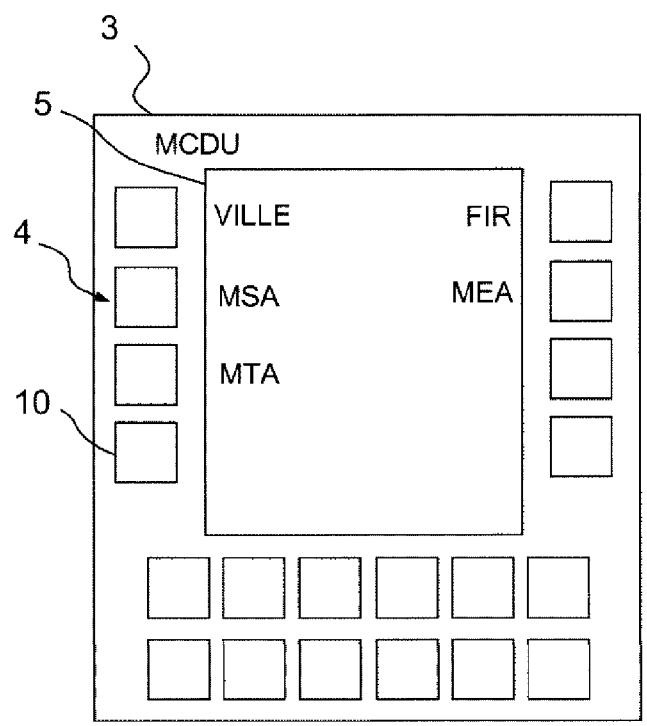
FIG. 3 represents schematically an example of a selection window.

The device 1 for aiding flight management according to the invention also comprises selection means SEL, 340, allowing an operator to select one (or more) type(s), called selected types TS, corresponding to the types of data that he wishes to see displayed on the navigation display ND, 5. The selection means SEL, 340, advantageously comprise means for manual inputting, for example, the inputting means 4 of the MCDU, 3, allowing the crew or the operator to input the name of one or more types called selected types or to select one or more types from a list of types displayed on a display screen, for example, the navigation display ND, 5. FIG. 3 shows an example of a selection window displayed on the navigation display ND, 5 (occupying the whole display). Appearing in this window is a list of types FIR, MEA, VILLE, MSA, TMA (the meanings of which have been described above) which the operator can select by means of the keys 10 of the input keyboard 4, which are facing this zone.

The selection means SEL, 340, are connected to extraction means EXT, 270. The extraction means EXT, 270, receiving the list of selected types TS, extract from the personalized database PersDB, 230, the navigation-aid datum or data called extracted data DE, the type T of which is equal to at least one selected type TS, of which at least one geographic zone ZG verifies a predetermined display geographic criterion CG and of which at least one period of validity P verifies a predetermined display time criterion CT, the said extraction means EXT, 270, transmitting the said extracted datum or data DE to the said navigation display ND, 5, capable of displaying the representations R of the said extracted data DE.

The navigation display ND, 5, is capable of displaying a navigation window comprising representations of elements of the flight plan and representations R of extracted data belonging to families of geographic data and/or a window dedicated to the representations R of the extracted datum belonging to the family of textual data. The navigation window displays the representations of the elements of the flight plan and of the extracted data DE that is in a predetermined display geographic zone ZA.

A geographic zone ZG verifies the display geographic criterion CG when it is situated at a distance D from the flight plan, that is less than a predetermined maximum distance Dmax. A zero maximum distance Dmax is chosen when it is desired to display on the navigation display only the representations of the data for which the geographic zone ZG intersects the flight plan. As a variant, a geographic zone ZG verifies the display geographic criterion CG when it is situated at a distance D from the aircraft. This variant is preferred when the aircraft is situated outside the flight plan. The value of the maximum distance Dmax advantageously depends on the selected type TS, that is to say on the nature of the information to be shown on the screen. For example, it is of particular value to display sector limits that intersect the flight plan while it is worthwhile to display piloting-aid geographic data situated in a perimeter around the flight plan.

The extraction means EXT, 270, are advantageously connected to the modules for constructing a lateral trajectory TRAJ, 120, and a vertical trajectory PRED, 140, and to the location means LOCNAV, 170, which transmit to them respectively the lateral, vertical trajectories and the position of the aircraft. The extraction means EXT, 270, advantageously comprise means (not shown) for computing the distance of the aircraft from the flight plan and for assessing the distance of a geographic zone ZG relative to the flight plan and/or to the position of the aircraft.

A period of validity verifies the display time criterion CT when its intersection with the period of flight PV is not zero. "Period of flight PV" means the period of time extending between the predicted departure time and the predicted time of arrival at the arrival position of the flight plan; this period is optionally extended around these two times in order to cover a slightly larger time interval for safety. This datum is advantageously transmitted by the flight-plan computing means to the extraction means EXT, 270. As a variant, if the geographic zone ZG of the same datum intersects the flight plan, a period of validity P of the said datum verifies the display time criterion CT when at least one estimated time of passage at a point of intersection between the geographic zone ZG and the flight plan is included in at least one period of validity P of the said datum. The extraction means advantageously comprise means for calculating, based on the lateral trajectory and on the vertical trajectory, the estimated passage time(s) at the point(s) of intersection between a geographic zone ZG and the flight plan, and means of comparison between the period(s) of validity P of a personalized datum and the period of flight PV or the estimated passage time(s) at the aforementioned intersection points.

As a variant, a datum is extracted when it is also valid (that is to say when the current time, at the moment of extraction, is included in a period of validity). In this way, all that is displayed are the representations of the data that are valid at the time of the extraction. As a variant, a navigation-aid datum D is extracted if it also verifies other conditions, taken alone or in combination, described below. For example, a datum is extracted if also its geographic zone verifying the display geographic criterion CG is included at least partly in a display zone ZA. This condition is particularly valuable for the geographic data that are displayed on a navigation window displaying the representation of the elements of the flight plan and of the extracted data of the family of geographic data which are situated in a given geographic zone ZA. Advantageously, the navigation window also displays representations of data stored in the navigation database NavDB, 130, relating to zones situated in the display zone ZA.

Figure 4:
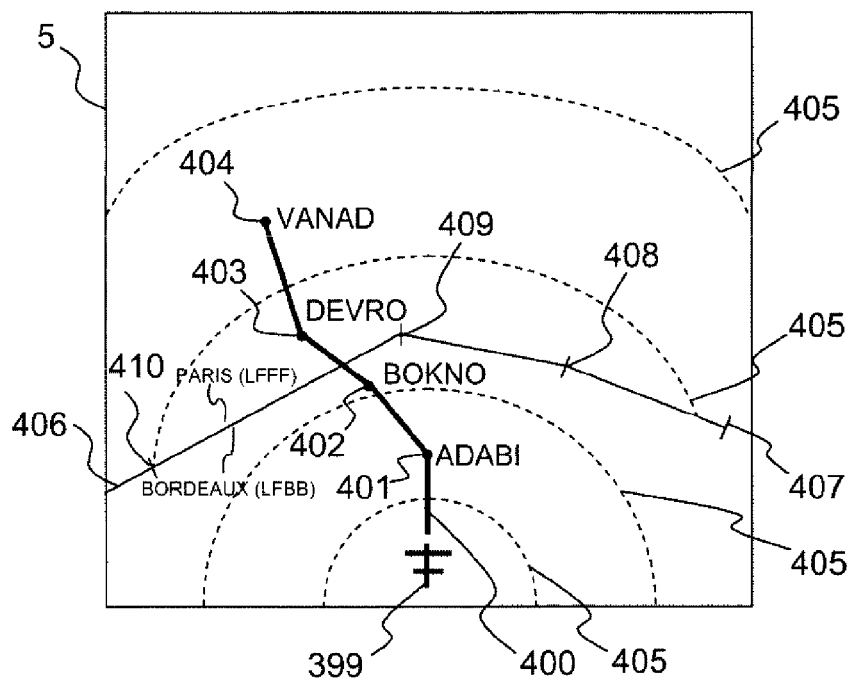
FIG. 4 represents schematically a first example of a window dedicated to navigation.
Figure 5:
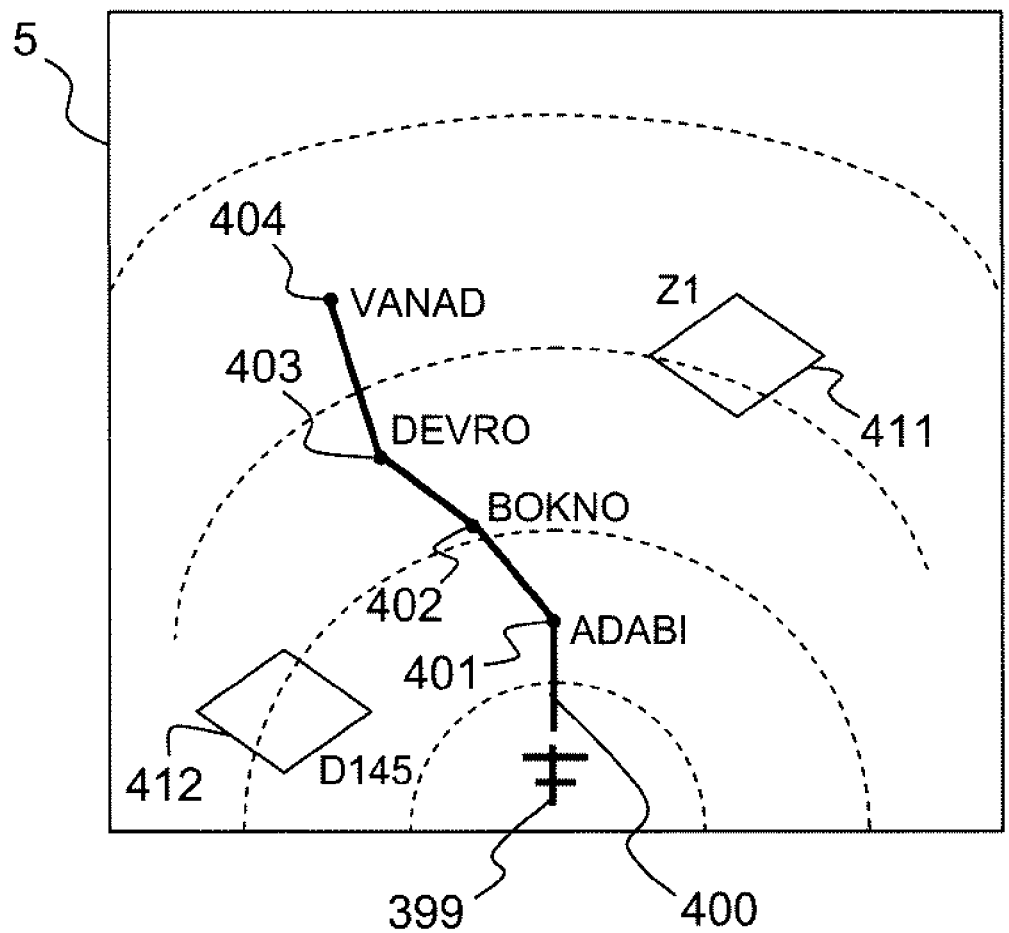
FIG. 5 represents schematically a second example of a window dedicated to navigation.

A first example of a navigation window is displayed occupying the whole navigation display ND, 5, in FIG. 4. In this example, the navigation display ND, 5, displays in bold a graphic representation 400 of the portion of the lateral trajectory of the flight plan included in a predetermined geographic zone ZA. The geographic representation shows the shape of a curve comprising a succession of segments linking waypoints 401, 402, 403, 404 represented by dots and associated with respective texts: ADABI, BOKNO, DEVRO, VANAD. The navigation window also displays a set of graduations 405 shown in dashed lines on the navigation display ND, 5, and a representation of an extracted datum of the "flight information region FIR" type. This representation comprises a graphic representation 406 which in this instance is a curve shown in fine lines comprising a series of segments connecting points 407, 408, 409, 410 represented graphically by dashes. This representation also comprises textual information "PARIS (LFFF)" and "BORDEAUX (LFBB)" placed on either side of the line identifying the air spaces by name. In practice, the lines representing the flight plan and the geographic data can be differentiated on the display by their colour. FIG. 5 shows a second example of a flight information display window. It comprises the same elements of the flight plan as on FIG. 4 and a representation of two polygon-shaped extracted geographic data. This representation comprises graphic representations in the form of two polygons 411, 412 situated in the display zone. Each polygon is associated respectively with an item of textual information representative of a zone name Z1, D145.

Advantageously, a navigation-aid datum also comprises one or more visibility slots. A visibility slot corresponds to a time slot or to a luminosity slot in which it is preferable to display the said datum. The display of a geographic datum of the town, river, forest type is for example useful only when the crew cannot view it directly, that is to say for example at night. Advantageously, a datum is extracted only if also the visibility outside the aircraft belongs to at least one visibility slot of the said datum. The outside visibility is characterized by the time or else the outside luminosity measured by conventional measurement means.

Advantageously, a navigation-aid datum also comprises a range of navigation scales within which the datum is desired to be displayed. The navigation scale of the navigation display is the ratio that exists between the size of the display zone ZA displayed and the size of the navigation display ND, 5. For example it is possible to prefer not to display navigation-aid geographic data (rivers, towns, etc.) when the navigation scale is greater than a predetermined threshold. Specifically, the larger the display geographic zone, the greater a risk of overloading the screen by showing thereon a considerable number of navigation-aid data. Advantageously, a datum is extracted only if the navigation scale of the navigation display also belongs to the navigation scale slot of the said datum.

Advantageously, a datum is extracted only when it is stored in the homologated storage space HOM, 290. Therefore, all that is displayed are the personalized data that are validated. This makes it possible to ensure that the actions carried out by the pilot are based on reliable information.

Advantageously, a navigation-aid datum also comprises one or more display contexts. The context of the aircraft corresponds, for example, to the load of the aircraft, to the presence of faults, or to the flight phase (approach, on the ground, take-off,. etc.). Advantageously, a datum is extracted only when its display context corresponds to the context of the aircraft. The context can be linked to an air route, an airport, a flight phase such as the approach. For example, on approach by sight, certain obstacles or geographic elements (rivers, towns) appear on the screen. The advantage is that pertinent information is shown at the right time.

In a second embodiment of the invention, a maximum number NMAX of extracted data is fixed for a given display scale. In this embodiment, a navigation-aid datum comprises a degree of importance representative of the degree of importance of the display of the datum (which relates to the usefulness of this datum for the crew). For example, the importance indicator may correspond to the following degrees of importance: "non-critical", "necessary", "obligatory". The navigation-aid device 1 according to the second embodiment comprises extraction means 270 comprising filtering means (not shown). The filtering means are capable of deleting, when the number of extracted data is greater than the maximum number NMAX, the extracted data of which the degree of importance is less, so as to keep only a number N of extracted data that is less than or equal to the maximum number NMAX of extracted data. Only the N extracted data are transmitted to the navigation display. This prevents overloading the display.

Figure 6:
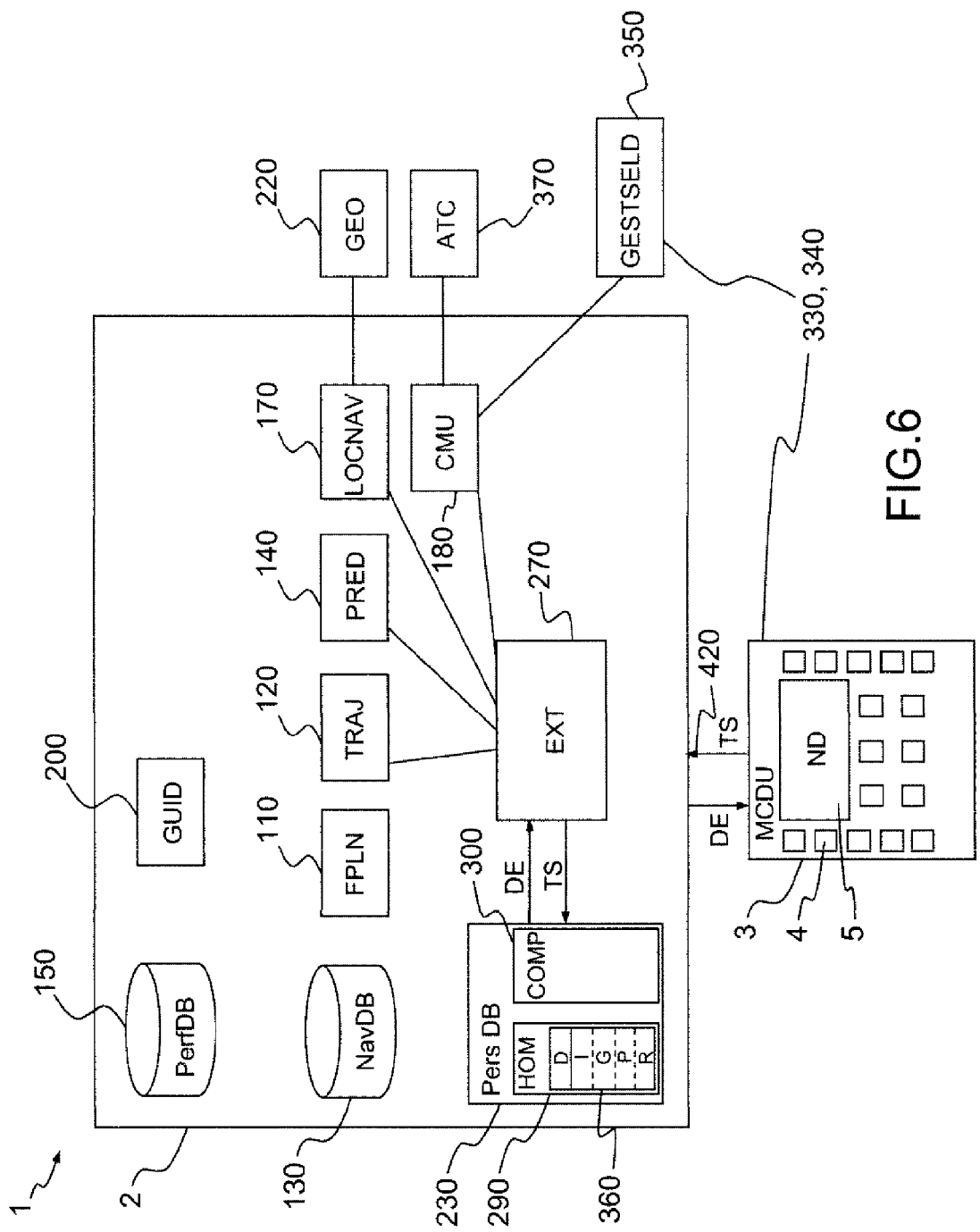
FIG. 6 represents schematically a preferred embodiment of a device according to the invention.

FIG. 6 shows a preferred embodiment of the invention. In the embodiment shown in FIG. 2, the extraction means and the personalized database PersDB, 230, are not incorporated into the flight management system; they are, for example, included in a server linked to the FMS, 2. In the preferred embodiment shown in FIG. 6, these elements are included in the FMS, 2. As a variant, at least one of these elements is included in a server connected to the flight management system FMS, 2.

In the embodiment shown in FIG. 6, the management means GEST, 330, of the personalized database and the selection means SEL, 340, include the on-board console MCDU, 3, comprising the navigation display, 5, and (/or) remote management and selection means GESTSELD, 350, connected to the said extraction means and to the said personalized database by means of the ground/on-board communication system CMU, 180.

Advantageously, the extraction means EXT, 270, extract the extracted data at regular time intervals so as to regularly update the information displayed on the navigation display.

The displayed information adapts to the needs of the pilot along the flight plan and to the change of the navigation database during the flight. When possible, the data must be verified mutually with the data available in the navigation database so as to ensure consistency between the various databases. This verification can be carried out on the navigation display or using a navigation map if there is doubt.

What is claimed is:

1. A device for aiding flight management of an aircraft comprising a navigation display and a flight management system comprising means for computing a flight plan that the aircraft is assumed to have to follow, wherein said device further comprises:
   a personalized database storing navigation-aid data, each datum comprising a classification type representative of a family or of one or more categories of navigation-aid data, one or more periods of validity of the datum, information relating to at least one geographic zone of the datum, at least one graphic and textual representation of the datum, and a visibility slot;
   selection means allowing an operator to choose at least one type of classification defined as a selected type; and
   extraction means extracting from the personalized database the navigation-aid datum defined as extracted data of which the type is equal to at least one selected type, of which at least one geographic zone is situated at a distance, from the flight plan or from the aircraft, that is less than a predetermined maximum distance, of which at least one period of validity verifies a predefined display time criterion, and of which at least one visibility slot comprises external visibility,
   wherein said extraction means further being configured for transmitting the extracted datum or data to the navigation display, the navigation display configured for displaying the representations of the extracted data.

2. The device for aiding the flight management of an aircraft according to claim 1, wherein the family of a navigation-aid datum is either a family of textual data, or a family of geographic data taken from a family of air-traffic management data or a family of piloting-aid geographic data.

3. The device for aiding the flight management of an aircraft according to claim 2, wherein the navigation display is configured for displaying a window dedicated to the representations of the extracted data belonging to at least one of the family of textual data and a navigation-specific window dedicated to displaying representations of elements of the flight plan and representations of the extracted data belonging to a family of geographic data.

4. The device for aiding the flight management of an aircraft according to claim 1, wherein the extraction means are configured for extracting the navigation-aid datum or data in which the geographic zone is situated at a distance, from the flight plan or from the aircraft, that is less than the maximum distance and is also at least partly included in a predetermined geographic zone of display.

5. The device for aiding the flight management of an aircraft according to claim 1, wherein a period of validity of a navigation-aid datum verifies the display time criterion when an intersection between the period of validity of the datum and a period of flight, during which the aircraft is assumed to have to follow the flight plan, is not zero.

6. The device for aiding the flight management of an aircraft according to claim 1, wherein a period of validity of a navigation-aid datum verifies the display time criterion when at least one estimated time of passage at a point of intersection between at least one geographic zone of the datum and the flight plan is included in at least one period of validity of the datum.

7. The device for aiding the flight management of an aircraft according to claim 5, wherein the extraction means are configured for extracting the navigation-aid datum or data in which also at least one period of validity includes the current time.

8. The device for aiding the flight management of an aircraft according to claim 6, wherein the extraction means are configured for extracting the navigation-aid datum or data in which also at least one period of validity includes the current time.

9. The device for aiding the flight management of an aircraft according to claim 3, wherein a navigation-aid datum also comprises a range of display scales and the extraction means are configured for extracting the navigation-aid datum or data in which also the range of display scales comprises a display scale of a navigation window defined by a ratio between a size of a display zone and a size of the navigation display.

10. The device for aiding the flight management of an aircraft according to claim 1, wherein the personalized database comprises a homologated storage space containing data which have been validated by an operator outside a crew and the extraction means are configured for extracting the navigation-aid datum or data also being stored in the homologated storage space.

11. The device for aiding the flight management of an aircraft according to claim 1, wherein a navigation-aid datum also comprises a display context and the extraction means are configured for extracting the navigation-aid datum or data in which also the display context corresponds to a context of the aircraft relative to the load of the aircraft, the presence of failures or a flight phase.

12. The device for aiding the flight management of an aircraft according to claim 2, wherein the families of navigation-aid data are divided into categories.

13. A device for aiding flight management of an aircraft comprising a navigation display and a flight management system comprising a computer configured to generate a flight plan that the aircraft is assumed to have to follow, wherein said device further comprises:
   a personalized database storing navigation-aid data, each datum comprising a classification type representative of a family or of one or more categories of navigation-aid data, one or more periods of validity of the datum, information relating to at least one geographic zone of the datum, at least one graphic and textual representation of the datum, and a visibility slot;

a selection device configured to allow an operator to choose at least one type of classification defined as a selected type; and an extraction device configured to extract from the personalized database the navigation-aid datum defined as extracted data of which the type is equal to at least one selected type, of which at least one geographic zone is situated at a distance, from the flight plan or from the aircraft, that is less than a predetermined maximum distance, of which at least one period of validity verifies a predefined display time criterion, and of which at least one visibility slot comprises external visibility, wherein said extraction device further being configured for transmitting the extracted datum or data to the navigation display, the navigation display configured for displaying the representations of the extracted data.

14. The device for aiding the flight management of an aircraft according to claim 13, wherein the family of a navigation-aid datum is either a family of textual data, or a family of geographic data taken from a family of air-traffic management data or a family of piloting-aid geographic data.

15. The device for aiding the flight management of an aircraft according to claim 14, wherein the navigation display is configured for displaying a window dedicated to the representations of the extracted data belonging to at least one of the family of textual data and a navigation-specific window dedicated to displaying representations of elements of the flight plan and representations of the extracted data belonging to a family of geographic data.

16. The device for aiding the flight management of an aircraft according to claim 13, wherein the extraction device is configured for extracting the navigation-aid datum or data in which the geographic zone is situated at a distance, from the flight plan or from the aircraft, that is less than the maximum distance and is also at least partly included in a predetermined geographic zone of display.

17. The device for aiding the flight management of an aircraft according to claim 13, wherein a period of validity of a navigation-aid datum verifies the display time criterion when an intersection between the period of validity of the datum and a period of flight, during which the aircraft is assumed to have to follow the flight plan, is not zero.

18. The device for aiding the flight management of an aircraft according to claim 13, wherein a period of validity of a navigation-aid datum verifies the display time criterion when at least one estimated time of passage at a point of intersection between at least one geographic zone of the datum and the flight plan is included in at least one period of validity of the datum.

19. The device for aiding the flight management of an aircraft according to claim 17, wherein the extraction device is configured for extracting the navigation-aid datum or data in which also at least one period of validity includes the current time.

20. The device for aiding the flight management of an aircraft according to claim 18, wherein the extraction device is configured for extracting the navigation-aid datum or data in which also at least one period of validity includes the current time.

* * * * *